(12) United States Patent
Takesue et al.

(10) Patent No.: US 7,008,333 B2
(45) Date of Patent: Mar. 7, 2006

(54) GOLF BALL

(75) Inventors: Rinya Takesue, Chichibu (JP);
Hiroyuki Nagasawa, Chichibu (JP);
Yoko Furuta, Nagoya (JP); Yasuharu Kawaguchi, Nagoya (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 35 days.

(21) Appl. No.: 10/876,241

(22) Filed: Jun. 25, 2004

(65) Prior Publication Data

US 2005/0288125 A1 Dec. 29, 2005

(51) Int. Cl.
*A63B 37/06* (2006.01)

(52) U.S. Cl. ........................... 473/374; 473/378
(58) Field of Classification Search ............... 473/373, 473/378, 374, 361
See application file for complete search history.

(56) References Cited

U.S. PATENT DOCUMENTS

| | | | |
|---|---|---|---|
| 4,694,049 A | 9/1987 | Morita et al. | |
| 5,439,227 A | 8/1995 | Egashira et al. | |
| 5,556,098 A | 9/1996 | Higuchi et al. | |
| 6,663,507 B1 | 12/2003 | Watanabe et al. | |
| 6,747,100 B1 | 6/2004 | Ichikawa et al. | |
| 2002/0119840 A1 * | 8/2002 | Higuchi et al. | 473/384 |
| 2003/0064835 A1 * | 4/2003 | Ichikawa et al. | 473/378 |
| 2004/0176190 A1 * | 9/2004 | Higuchi et al. | 473/378 |

FOREIGN PATENT DOCUMENTS

| | | |
|---|---|---|
| JP | 52-786 | 1/1977 |
| JP | 52-121699 | 10/1977 |
| JP | 57-078413 A | 5/1982 |
| JP | 61-111318 A | 5/1986 |
| JP | 06-142228 A | 5/1994 |
| JP | 07-024084 A | 1/1995 |
| JP | 09-136934 A | 5/1997 |
| JP | 10-101761 A | 4/1998 |
| JP | 2002-336378 A | 11/2002 |
| JP | 2004-049913 A | 2/2004 |

* cited by examiner

*Primary Examiner*—Raeann Gorden
(74) *Attorney, Agent, or Firm*—Sughrue Mion, PLLC

(57) ABSTRACT

The invention provides a golf ball comprising a core of at least one layer, a cover of at least one layer, and optionally an intermediate layer therebetween, characterized in that at least one layer of the core, cover and intermediate layer is formed of a golf ball-forming resin composition comprising (A) 50–95% by weight of a polyether ester block copolymer composed primarily of (a) high-melting crystalline polymer segments made of crystalline aromatic polyester units and (b) low-melting polymer segments made of aliphatic polyether units and (B) 5–50% by weight of a thermoplastic polyurethane elastomer, the total of components (A) and (B) being 100 parts by weight, in admixture with (C) 0.05–10 parts by weight of a polyisocyanate compound. The inventive golf ball is improved in travel distance, feel, scuff resistance and impact durability.

8 Claims, No Drawings

GOLF BALL

BACKGROUND OF THE INVENTION

This invention relates to golf balls formed using golf ball-forming resin compositions which have flexibility and high rebound and are tough and fully wear resistant and impact resistant, and improved in travel distance, feel, scuff resistance and durability to repeated impact.

Polyether ester block copolymers comprising crystalline aromatic polyester units such as polybutylene terephthalate units as hard segments and aliphatic polyether units such as poly(alkylene oxide) glycols as soft segments have been of great interest as golf ball-forming resin compositions because they are flexible and highly rebound, have good mechanical properties such as strength, impact resistance and elastic recovery, and satisfactory low- and high-temperature properties, and are thermoplastic and easy to mold and work. One example is the golf ball-forming resin composition described in JP-A 7-24084.

Despite such excellent physical properties, polyether ester block copolymers are difficult to use as the cover because of shortage of scuff resistance and durability to repeated impact. Heretofore, their use has been limited to the intermediate layer of multi-piece golf balls including three- and four-piece balls. Meanwhile, ionomer resins in the form of copolymers of α-olefins and α,β-unsaturated carboxylic acids neutralized with mono- to tri-valent metal ions have long been used as the cover material, as described in JP-A 6-142228, because the ionomer resins are thermoplastic, easy to mold and work, very tough, unsusceptible to rupture even under considerable deformation at high speeds, and very advantageous in improving the scuff resistance and durability to repeated impact of golf balls.

However, these materials give a hard feel due to shortage of flexibility. It was thus proposed to use flexibilized ionomer resins in the form of copolymers of α-olefins, α,β-unsaturated carboxylic acids and α,β-unsaturated carboxylic acid esters neutralized with mono- to tri-valent metal ions, as the golf ball-forming composition. However, such flexibilized ionomer resins are inferior in rebound, low-temperature properties and scuff resistance, with further improvements being demanded.

A thermoplastic polyurethane composition made an appearance as a new cover-forming material, as described in JP-A 2004-49913. Proposed therein was a golf ball having a good balance of flight, controllability, spin stability, feel, scuff resistance and impact durability.

In this material, however, an attempt to render the material more flexible in order to improve the feel can be made at the expense of rebound and scuff resistance. Therefore, there is a desire to have a cover-forming material which takes advantage of the high rebound and soft feel of polyether ester block copolymers, and can be used to manufacture golf balls which are good in travel distance, feel, scuff resistance and durability to repeated impact; and a golf ball having a cover formed of such material.

There was proposed a resin composition in which a thermoplastic polyurethane elastomer is blended with a polyether ester block copolymer for the purpose of improving moldability, heat resistance and hydrolytic resistance (see, for example, JP-B 52-786). Also proposed were block copolymerized thermoplastic polyurethane elastomers which are obtained by reacting polyether ester block copolymers with polyisocyanate compounds for the purpose of improving moldability and heat resistance (see, for example, JP-A 52-121699 and JP-A 57-78413). Also proposed was a composition comprising a polyester block copolymer in admixture with a specific diisocyanate compound for the purposes of improving flexural fatigue resistance and fisheyes during molding (see, for example, JP-A 61-111318). Further proposed were wear resistant resin compositions comprising a polyether ester block copolymer in admixture with a polyisocyanate compound and a silicone compound (see, for example, JP-A 9-136934 and JP-A 10-101761).

All these resin compositions, however, fail to produce golf balls which satisfy the performance requirements including softness, high rebound, toughness and good wear resistance, and are improved in travel distance, feel, scuff resistance and durability to repeated impact.

An additional proposal is a golf ball using a composition comprising a mixture in which a thermoplastic polyurethane material and isocyanate are dispersed in a thermoplastic resin as described in JP-A 2002-336378, which is desired to have more rebound.

SUMMARY OF THE INVENTION

An object of the present invention, which has been made under the above-discussed circumstances, is to provide golf balls formed using golf ball-forming resin compositions which have flexibility and high rebound and are tough, fully wear resistant and impact resistant, and improved in travel distance, feel, scuff resistance and impact durability.

Making extensive investigations to achieve the above object, the inventors have discovered that a golf ball-forming resin composition comprising (A) 50 to 95% by weight of a polyether ester block copolymer composed primarily of (a) high-melting crystalline polymer segments made of crystalline aromatic polyester units and (b) low-melting polymer segments made of aliphatic polyether units and (B) 5 to 50% by weight of a thermoplastic polyurethane elastomer, the total of components (A) and (B) being 100 parts by weight, in admixture with (C) 0.05 to 10 parts by weight of a polyisocyanate compound has flexibility and high rebound and exhibits satisfactory wear resistance as well as toughness, wear resistance and impact resistance. When the above golf ball-forming resin composition is applied as the cover of a golf ball by injection molding, the golf ball is improved in travel distance, feel, scuff resistance and impact durability. The present invention is predicated on this discovery.

Accordingly, the present invention provides a golf ball as defined below.

[1] A golf ball comprising a core of at least one layer, a cover of at least one layer, and optionally an intermediate layer therebetween, characterized in that
at least one layer of said core, said cover and said intermediate layer is formed of a golf ball-forming resin composition comprising (A) 50 to 95% by weight of a polyether ester block copolymer composed primarily of (a) high-melting crystalline polymer segments made of crystalline aromatic polyester units and (b) low-melting polymer segments made of aliphatic polyether units and (B) 5 to 50% by weight of a thermoplastic polyurethane elastomer, the total of components (A) and (B) being 100 parts by weight, in admixture with (C) 0.05 to 10 parts by weight of a polyisocyanate compound.

[2] The golf ball of claim 1, wherein said polyisocyanate compound (C) is a polyisocyanate compound containing, on average, more than two isocyanate groups in a molecule.

[3] The golf ball of claim 1, wherein at least 50% by weight of said polyisocyanate compound (C) is a polyisocyanate compound containing at least three isocyanate groups in a molecule.

[4] The golf ball of claim 1, wherein at least 70% by weight of said polyisocyanate compound (C) is a polyisocyanate compound containing at least three isocyanate groups in a molecule.

[5] The golf ball of claim 1, wherein a molded product molded from said golf ball-forming resin composition by injection molding or the like has a Shore D hardness of 25 to 85 based on ASTM D-2240 and a rebound resilience of 40 to 90% based on British Standard 903.

[6] The golf ball of claim 1, wherein when a molded product molded from said golf ball-forming resin composition by injection molding or the like is subjected to sliding wear according to JIS K7218, Method A by rotating a hollow ring of metal under an applied load, the molded product has a specific wear rate, as determined under conditions: a test speed v of 0.5 m/s, a test load P of 50 N, and a sliding distance L of 3 km, that satisfies the formula (1):

$$Vx = [(Wa - Wb)/(\rho \cdot 1000)]/(P \cdot L) \leq 0.5 \quad (1)$$

wherein $Vx$ is a specific wear rate ($mm^3/(N \cdot km)$) of said golf ball-forming resin composition, Wa and Wb are the weights (mg) of a test piece in the form of the molded product of said golf ball-forming resin composition before and after the test, respectively, and $\rho$ is the density ($kg/m^3$) of said golf ball-forming resin composition.

[7] The golf ball of claim 1, which is a two-piece golf ball consisting of a single layer core and a single layer cover wherein said golf ball-forming resin composition is applied as the material of said cover.

[8] The golf ball of claim 1, which is a three-piece golf ball consisting of a single layer core, a single layer cover and an intermediate layer wherein said golf ball-forming resin composition is applied as the material of said cover.

DETAILED DESCRIPTION OF THE INVENTION

The present invention is described below in detail.

The invention provides a golf ball comprising a core of at least one layer, a cover of at least one layer, and optionally an intermediate layer therebetween, wherein at least one layer of the core, the cover and the intermediate layer is formed of a specific golf ball-forming resin composition. This golf ball-forming resin composition is described in detail.

One component in the golf ball-forming resin composition is (A) a polyether ester block copolymer which is composed primarily of (a) high-melting crystalline polymer segments made of crystalline aromatic polyester units and (b) low-melting polymer segments made of aliphatic polyether units.

The high-melting crystalline polymer segments (a) are made of crystalline aromatic polyester units formed from an aromatic dicarboxylic acid or ester-forming derivative thereof in combination with an aliphatic diol, and preferably polybutylene terephthalate units derived from terephthalic acid and/or dimethyl terephthalate in combination with 1,4-butanediol. Also useful are polyester units derived from a dicarboxylic acid component such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid or an ester-forming derivative thereof in combination with a diol having a molecular weight of up to 300, for example, an aliphatic diol such as 1,4-butanediol, ethylene glycol, trimethylene glycol, pentamethylene glycol, hexamethylene glycol, neopentyl glycol or decamethylene glycol, an alicyclic diol such as 1,4-cyclohexanedimethanol or tricyclodecanedimethylol, or an aromatic diol such as xylylene glycol, bis(p-hydroxy)diphenyl, bis(p-hydroxyphenyl)propane, 2,2-bis[4-(2-hydroxyethoxy)-phenyl]propane, bis[4-(2-hydroxy)phenyl]sulfone, 1,1-bis[4-(2-hydroxyethoxy)phenyl]cyclohexane, 4,4'-dihydroxy-p-terphenyl or 4,4'-dihydroxy-p-quarterphenyl. Use can also be made of any copolymeric polyester units obtained using two or more of the foregoing dicarboxylic acid components and diol components. In addition, polycarboxylic acid components, polyoxy acid components and polyhydroxy components having a functionality of three or more can be copolymerized therein within a range of up to 5 mol %.

The low-melting polymer segments (b) of the polyether ester block copolymer (A) are units composed primarily of aliphatic polyether. Illustrative examples of the aliphatic polyether include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymers of poly(propylene oxide) glycol, and copolymers of ethylene oxide and tetrahydrofuran. Of these aliphatic polyethers, use of poly(tetramethylene oxide) glycol and ethylene oxide addition polymers of poly(propylene oxide) glycol is preferred because the resulting polyester block copolymers have better elastic properties. The low-melting polymer segments preferably have a number-average molecular weight of about 300 to 6,000 in the copolymerized state.

In the polyether ester block copolymer (A), the amount of low-melting polymer segments (b) copolymerized is preferably in the range of 10 to 80% by weight, more preferably 15 to 75% by weight.

The polyether ester block copolymer (A) is prepared by melt polycondensation. Melt polycondensation can be performed by well-known methods. There may be used any of methods including, for example, a method of effecting transesterification reaction of a lower alcohol diester of dicarboxylic acid, an excess of a low molecular weight glycol, and a low-melting polymer segment component in the presence of a catalyst, followed by polycondensation of the resulting reaction product; a method of effecting esterification reaction of a dicarboxylic acid, an excess of a glycol, and a low-melting polymer segment component in the presence of a catalyst, followed by polycondensation of the resulting reaction product; and a method of preforming high-melting crystalline segments, adding a low-melting segment component thereto, and effecting transesterification reaction for randomization.

The polyether ester block copolymer (A) resulting from melt polycondensation is then processed into fine particles. Processing into fine particles may be done by a cold cut method of taking out the polyether ester block copolymer (A) in gut or sheet form and pelletizing the copolymer by means of a cutter; or a hot cut method of pelletizing the copolymer without once shaping into gut or sheet form. Alternatively, fine particles may be obtained by taking out the polyether ester block copolymer (A) in mass form, followed by pulverization.

Another component in the golf ball-forming resin composition is (B) a thermoplastic polyurethane elastomer, which is a block copolymer comprising a polyurethane component as hard segments and an aliphatic polyether, aliphatic polyester or aliphatic polycarbonate having a molecular weight of about 700 to 8,000 as soft segments. Suitable aliphatic polyethers include poly(ethylene oxide) glycol, poly(propylene oxide) glycol, poly(tetramethylene oxide) glycol, etc.; suitable aliphatic polyesters include polyethylene adipate, polybutylene adipate, polybutylene sebacate, polycaprolactone, etc.; and suitable aliphatic polycarbonates include polyhexanediol carbonate, etc. Of these soft segments, those using aliphatic polyethers such as poly(tetramethylene oxide) glycol are preferred because the resulting thermoplastic polyurethane elastomer has better elastic and low-temperature properties. The thermoplastic polyurethane elastomer (B) used herein is synthesized from a soft segment component as mentioned above, a diisocyanate compound such as 4,4'-diphenylmethane diisocyanate, 4,4'-dicyclohexylmethane diisocyanate, toluene diisocyanate or 1,6-hexamethylene diisocyanate, and a glycol such as ethylene glycol, 1,4-butanediol or 1,6-hexanediol. There are fully chain-like elastomers and partially branched and crosslinked elastomers, either of which may be used herein.

A further component in the golf ball-forming resin composition is (C) a polyisocyanate compound, which may be a compound containing, on average, at least two isocyanate groups in a molecule. It is preferred to use a polyisocyanate compound containing, on average, more than two isocyanate groups in a molecule, and more preferably a polyisocyanate compound containing at least three isocyanate groups in a molecule. It is also acceptable to use a mixture of a polyisocyanate compound containing two isocyanate groups in a molecule and a polyisocyanate compound containing at least three isocyanate groups in a molecule.

Examples of the diisocyanate compound containing two isocyanate groups in a molecule include aliphatic diisocyanates such as ethylene diisocyanate, 1,4-tetramethylene diisocyanate, ethyl (2,6-diisocyanato)-hexanoate, 1,6-hexamethylene diisocyanate, 1,12-dodecamethylene diisocyanate, 2,2,4- or 2,4,4-trimethylhexamethylene diisocyanate, lysine diisocyanate, 2,6-diisocyanatomethyl caproate, bis(2-isocyanatoethyl) fumarate, bis(2-isocyanatoethyl) carbonate and 2-isocyanatoethyl-2,6-diisocyanatohexanoate; alicyclic isocyanates such as 1,3- or 1,4-bis(isocyanate-methylcyclohexane), 1,3- or 1,4-diisocyanatocyclohexane, 3,5,5-trimethyl(3-isocyanatomethyl)cyclohexyl isocyanate, dicyclohexylmethane-4,4'-diisocyanate, and 2,5- or 2,6-diisocyanatonorbornane; aralkylene diisocyanates such as m-xylylene diisocyanate and α,α,α',α'-tetramethyl-m-xylylene diisocyanate; and aromatic diisocyanates such as m- or p-phenylene diisocyanate, tolylene-2,4- or 2,6-diisocyanate, diphenylmethane-4,4'-diisocyanate, naphthalene-1,5-diisocyanate, diphenyl-4,4'-diisocyanate, 4,4'-diisocyanato-3, 3'-dimethyldiphenyl, 3-methyl-diphenylmethane-4,4'-diisocyanate, and diphenyl ether-4,4'-diisocyanate.

Examples of the polyisocyanate compound containing at least three isocyanate groups in a molecule include 1,3,6-hexamethylene triisocyanate, 1,8-diisocyanato-4-isocyanatomethyloctane, 2-isocyanatoethyl(2,6-diisocyanato)-hexanoate, 2,5- or 2,6-diisocyanatomethyl-2-isocyanatopropylnorbornane, triphenylmethanetriisocyanate, tris(isocyanatophenyl)thiophosphate, and polymethylene polyphenylene polyisocyanate. Also included are polyisocyanates having an isocyanurate structure resulting from cyclo-trimerization of isocyanate groups on the foregoing diisocyanates or triisocyanates.

The polyisocyanate compound (C) is not particularly limited as long as it contains, on average, at least two isocyanate groups in a molecule. In a preferred embodiment, at least 50% by weight of the polyisocyanate compound used is a polyisocyanate compound containing at least three isocyanate groups in a molecule. In a more preferred embodiment, at least 70% by weight of the polyisocyanate compound used is a polyisocyanate compound containing at least three isocyanate groups in a molecule.

The golf ball-forming resin composition comprises 50 to 95% by weight, preferably 75 to 95% by weight of the polyether ester block copolymer (A) and 5 to 50% by weight, preferably 5 to 25% by weight of the thermoplastic polyurethane elastomer (B), the total of components (A) and (B) being 100 parts by weight, in admixture with 0.05 to 10 parts by weight, preferably 0.1 to 5 parts by weight, more preferably 0.2 to 3 parts by weight of the polyisocyanate compound (C). Less than 50% by weight of the polyether ester block copolymer (A) blended leads to a lower rebound resilience whereas more than 95% by weight leads to a lower wear resistance. Amounts of the polyisocyanate compound (C) less than the range fail to impart satisfactory performance whereas amounts greater than the range undesirably cause the composition to gel during melt processing and thus become impossible to mold.

The golf ball-forming resin composition contains the above-described components (A), (B) and (C) as essential components, and various additives may be incorporated therein as long as the objects of the invention are not impaired. For example, there may be incorporated any of antioxidants such as well-known hindered phenols, phosphates, thioesters and aromatic amines, sun-proofing agents such as benzophenones, benzotriazoles and hindered amines, colorants such as pigments and dyes, antistatic agents, electroconductive agents, flame retardants, reinforcing agents, fillers, plasticizers, and parting agents.

The golf ball-forming resin composition is obtainable by melt mixing the above-described components (A), (B) and (C) while adding various additives if necessary, as described above. For example, the following methods (a) to (g) may be employed.

Method (a) of dry blending the polyisocyanate compound (c) in a pellet mixture of the polyether ester block copolymer (A) and the thermoplastic polyurethane elastomer (B) or a melt mixed product of the polyether ester block copolymer (A) and the thermoplastic polyurethane elastomer (B) and injection molding the blend without previous melt mixing.

Method (b) of blending the polyisocyanate compound (C) in a thermoplastic resin to form master batch pellets, dry blending the master batch pellets in a pellet mixture of the polyether ester block copolymer (A) and the thermoplastic polyurethane elastomer (B) or a melt mixed product of the polyether ester block copolymer (A) and the thermoplastic polyurethane elastomer (B), and injection molding the blend without previous melt mixing. It is noted that the thermoplastic resin used in the master batch pellets should preferably be fully compatible with the polyether ester block copolymer, though not limited thereto.

Method (c) of blending the polyisocyanate compound (C) in a pellet mixture of the polyether ester block copolymer (A) and the thermoplastic polyurethane elastomer (B) or a melt mixed product of the polyether ester block copolymer (A) and the thermoplastic polyurethane elastomer (B) and feeding the blend to a screw extruder where they are melt mixed.

Method (d) of feeding a pellet mixture of the polyether ester block copolymer (A) and the thermoplastic polyurethane elastomer (B) or a melt mixed product of the polyether ester block copolymer (A) and the thermoplastic polyurethane elastomer (B) to a screw extruder where it is melted, feeding the polyisocyanate compound (C) via another feed port, and melt mixing them.

Method (e) of blending the polyisocyanate compound (C) in a thermoplastic resin to form master batch pellets, blending the master batch pellets in a pellet mixture of the polyether ester block copolymer (A) and the thermoplastic polyurethane elastomer (B) or a melt mixed product of the polyether ester block copolymer (A) and the thermoplastic polyurethane elastomer (B), feeding the blend to a screw extruder, and melt mixing them. It is noted that the thermoplastic resin used in the master batch pellets should preferably be fully compatible with the polyether ester block copolymer, though not limited thereto.

Method (f) of blending the polyisocyanate compound (C) in a pellet mixture of the polyether ester block copolymer (A) and the thermoplastic polyurethane elastomer (B) or a melt mixed product of the polyether ester block copolymer (A) and the thermoplastic polyurethane elastomer (B), feeding the blend to a mixer such as a roll mill, kneader or Banbury mixer, where they are melt mixed, feeding the melt to a screw extruder, and pelletizing.

Method (g) of blending the polyisocyanate compound (C) in a pellet mixture of the polyether ester block copolymer (A) and the thermoplastic polyurethane elastomer (B) or a melt mixed product of the polyether ester block copolymer (A) and the thermoplastic polyurethane elastomer (B), feeding the blend to a mixer such as a roll mill, kneader or Banbury mixer, where they are melt mixed, taking out the melt, cooling and pulverizing.

While the golf ball-forming resin composition comprises 100 parts by weight in total of 50–95% by weight the polyether ester block copolymer (A) and 5–50% by weight the thermoplastic polyurethane elastomer (B) in admixture with 0.05 to 10 parts by weight of the polyisocyanate compound (C) as described above, a molded product molded from the golf ball-forming resin composition by injection molding or the like should preferably have a Shore D hardness of 25 to 85 based on ASTM D-2240 and a rebound resilience of 40 to 90% based on British Standard 903.

Also preferably, when a molded product molded from the golf ball-forming resin composition by injection molding or the like is subjected to sliding wear according to JIS K7218, Method A by rotating a hollow ring of metal under an applied load, the molded product has a specific wear rate, as determined under conditions: a test speed v of 0.5 m/s, a test load P of 50 N, and a sliding distance L of 3 km, that satisfies the formula (1):

$$Vx=[(Wa-Wb)/(\rho \cdot 1000)]/(P \cdot L) \leq 0.5 \quad (1)$$

wherein $Vx$ is a specific wear rate ($mm^3/(N \cdot km)$) of the golf ball-forming resin composition, Wa and Wb are the weights (mg) of a test piece in the form of the molded product of the golf ball-forming resin composition before and after the test, respectively, and $\rho$ is the density ($kg/m^3$) of the golf ball-forming resin composition.

The golf ball of the invention having a ball structure that at least one layer is formed of the aforementioned golf ball-forming resin composition is improved in travel distance, feel, scuff resistance and impact durability, owing to the use of the golf ball-forming resin composition which has flexibility and high rebound and is tough and fully wear resistant.

More particularly, the golf ball of the invention, in which the aforementioned golf ball-forming resin composition is used as any of various golf ball-forming materials including a core material, intermediate layer material, cover material for golf balls, one-piece golf ball material, and solid center material (for wound golf balls), can be embodied as a two-piece golf ball consisting of a core and a cover, a multi-piece golf ball comprising a core enclosed with at least two layers of thermoplastic resin or rubber, a one-piece golf ball, a wound golf ball or the like.

Specifically, when a solid core is made of the inventive golf ball-forming resin composition, it may be formed to a diameter of at least 25.00 mm, especially at least 35.00 mm, and as the upper limit, up to 39.95 mm, especially up to 38.90 mm.

In an embodiment wherein the aforementioned golf ball-forming resin composition is used as a solid core material, an inert filler may be used for specific gravity adjustment so as to enable formation to a size and weight complying with the Rules of Golf. Exemplary inert fillers include zinc oxide, barium sulfate, silica, calcium carbonate and zinc carbonate, with barium sulfate being most preferred. The amount of the filler blended depends on the specific gravity of the core and cover, the weight and other specifications of the ball, and is typically at least 10 parts by weight, preferably at least 15 parts by weight, and as the upper limit, up to 60 parts by weight, preferably up to 30 parts by weight, per 100 parts by weight of the resin composition, but not limited thereto.

In another embodiment wherein the aforementioned golf ball-forming resin composition is used as an intermediate layer material, it may be formed to a thickness of at least 0.5 mm, preferably at least 1.0 mm, more preferably at least 1.4 mm, and as the upper limit, up to 3.0 mm, preferably up to 2.5 mm, more preferably up to 1.9 mm. Outside the range, a greater thickness may detract from repulsion and lead to a shorter travel distance whereas a less thickness may lead to poor durability.

In a further embodiment wherein the aforementioned golf ball-forming resin composition is used as a cover material, it may be formed to a thickness of at least 0.5 mm, preferably at least 1.0 mm, more preferably at least 1.4 mm, and as the upper limit, up to 3.0 mm, preferably up to 2.5 mm, more preferably up to 1.9 mm. Outside the range, a greater thickness may detract from repulsion and lead to a shorter travel distance whereas a less thickness may lead to poor durability.

In a still further embodiment wherein the aforementioned golf ball-forming resin composition is used as a one-piece golf ball material, it may be sized to at least 42.60 mm, preferably at least 42.65 mm, and as the upper limit, up to 42.75 mm, preferably up to 42.70 mm.

In the embodiments wherein the aforementioned golf ball-forming resin composition is used as the material for at least one layer of the ball structure, compression or injection molding in a mold is advantageously employed as the method of molding the resin composition. Injection molding is more advantageously employed.

The golf ball of the invention may be formed to a size and weight in accordance with the Rules of Golf, typically to a diameter of 42.65 to 42.75 mm and a weight of 45.0 to 45.5 grams.

While the golf balls of the invention may have various ball structures in which at least one layer is formed of the aforementioned golf ball-forming resin composition as described above, the invention can take full advantage of the resin composition when the resin composition is used as a cover material.

In manufacturing solid golf balls, the aforementioned resin composition may be employed as the core material, for example, although any of commonly used materials may also be employed. The core may be formed while adjusting vulcanizing conditions, formulation ratio and the like. In the core formulation, base rubber, a crosslinking agent, a co-crosslinking agent, an inert filler and the like are included. The base rubber used herein may be natural rubber and/or synthetic rubber which are conventionally used in solid golf balls although 1,4-polybutadiene having at least 40% cis-configuration is preferred in the practice of the invention. In this case, natural rubber, polyisoprene rubber, styrene-butadiene rubber or the like may be blended in the polybutadiene if desired.

Examples of the crosslinking agent include organic peroxides such as dicumyl peroxide and di-t-butyl peroxide, with dicumyl peroxide being most preferred. The amount of the crosslinking agent blended may be typically at least 0.5 parts by weight, preferably at least 0.8 parts by weight and as the upper limit, up to 3 parts by weight, preferably up to 1.5 parts by weight per 100 parts by weight of the base rubber.

Examples of the co-crosslinking agent include, but are not limited to, metal salts of unsaturated fatty acids, inter alia, zinc, magnesium and calcium salts of unsaturated fatty acids of 3 to 8 carbon atoms (e.g., acrylic acid and methacrylic acid), with the zinc salts being most preferred. The amount of the co-crosslinking agent blended may be typically at least 24 parts by weight, preferably at least 28 parts by weight and as the upper limit, up to 38 parts by weight, preferably up to 34 parts by weight per 100 parts by weight of the base rubber.

Examples of the inert filler include zinc oxide, barium sulfate, silica, calcium carbonate and zinc carbonate, with zinc oxide being most commonly used. The amount of the filler blended depends on the specific gravity of the core and cover, the weight and other specifications of the ball, and may be 10 to 60 parts by weight per 100 parts by weight of the base rubber, but not limited thereto.

A core-forming composition obtained by compounding the foregoing components is kneaded in an ordinary kneader such as a Banbury mixer or roll mill, then compression or injection molded in a core-forming mold. The molded composition may be cured by heating at a sufficient temperature for the crosslinking and co-crosslinking agents to work (for example, about 130 to 170° C. where dicumyl peroxide and zinc acrylate are used as the crosslinking and co-crosslinking agents, respectively).

The core manufactured by compounding the foregoing components may typically have a diameter of 38.85 to 39.95 mm, but is not limited thereto.

A two-piece ball is manufactured from the thus obtained core by using the aforementioned golf ball-forming resin composition as a cover material, placing the core in a mold which is used in conventional golf ball molding, and compression or injection molding the resin composition in the mold to form a cover.

It is also possible to form an intermediate layer by using the aforementioned golf ball-forming resin composition as an intermediate layer material, placing the core in a mold which is used in conventional golf ball molding, and compression or injection molding the resin composition. In this embodiment, a cover material is compression or injection molded subsequent to the intermediate layer, thereby completing a three-piece ball. As the cover material, well-known ionomer resins are preferably used. Examples include Himilan 1554, 1557, 1601, 1605, 1706, 1855, 1856, AM7315, AM7316, AM7317 and AM7318 (Dupont-Mitsui Polychemicals Co., Ltd.), and Surlyn 6320, 7930, 8120, 8945 and 9945 (E.I. DuPont de Nemours and Company).

In an embodiment wherein the aforementioned golf ball-forming resin composition is used as a cover material, a three-piece ball may be manufactured by placing a core in a mold which is used in conventional golf ball molding, using a polyether ester block copolymer, for example, as an intermediate layer material, compression or injection molding the copolymer in the mold where the core is held in place to form an intermediate layer, and thereafter compression or injection molding the golf ball-forming resin composition as the cover material therearound to form a cover.

The enclosure with the cover is followed by deburring, pretreatment and painting steps which may be carried out according to the conventional golf ball manufacturing process.

Owing to the use of a golf ball-forming resin composition which has flexibility and high rebound and is fully wear resistant, the golf ball of the present invention is improved in travel distance, feel, scuff resistance and impact durability.

EXAMPLE

Examples and comparative examples are given below for illustrating the invention, but the invention is not limited thereto. As used herein, all parts and percents are by weight except for % for rebound resilience. Physical properties of resins and golf balls as reported below were measured by the following procedures.

Resin Physical Properties

[Melting Point]

Using a differential scanning calorimeter (Model DSC-910 by DuPont), a sample was heated in a nitrogen gas atmosphere at a ramp rate of 10° C./min. The crest temperature of melting peak was measured.

[Melt Viscosity Index (MFR)]

measured under a load of 2160 g according to ASTM D-1238.

[Surface Hardness]

A hardness (Shore D hardness) was measured according to ASTM D-2240.

[Rebound Resilience]

measured according to British Standard 903.

[Specific Gravity]

measured according to ASTM D-792.

[Specific Wear Rate]

There was molded a disk having a diameter of 40 mm and a thickness of 3 mm which was compliant with Method A of JIS K7218. Using an abrasion friction tester (Model EFM-III-EN/F by Orientec Co., Ltd.), a sliding wear test was carried out according to JIS K7218, Method A by rotating a hollow ring of metal under an applied load on the molded disk. A specific wear rate as an index of wear resistance was determined under conditions: a test speed v of 0.5 m/s, a test load P of 50 N, and a sliding distance L of 3 km. The specific wear rate was computed according to the equation:

$$Vx=[(Wa-Wb)/(\rho \cdot 1000)]/(P \cdot L)$$

wherein $Vx$ is a specific wear rate ($mm^3/(N \cdot km)$) of the polyester elastomer resin composition, Wa and Wb are the weights (mg) of a test piece in the form of the molded disk of the polyester elastomer resin composition before and after the test, respectively, and $\rho$ is the density ($kg/m^3$) of the polyester elastomer resin composition. Of these parameters, the density ρ (kg/m$^3$) was a value calculated as (specific gravity)/1000.

Golf Ball Physical Properties

[Outer Diameter]

The outer diameter (mm) of the core, intermediate layer-coated state or finished ball was measured.

[Weight]

The weight (g) of the core, intermediate layer-coated state or finished ball was measured.

[Hardness]

An amount of deflection or deformation under a load of 100 kg of the core, intermediate layer-coated state or finished ball was measured. Greater numerical values indicate softer states.

[Travel Distance]

Using a hitting machine (by Miyamae Co., Ltd.), a ball was hit with a driver (W#1) at a head speed of 45 m/s. A carry and a total distance were measured.

[Durability to Repeated Impact]

Using a hitting machine (by Miyamae Co., Ltd.), a ball was repeatedly hit with a driver (W#1) at a head speed of 45 m/s. Signs of damage by impact were visually examined. A reference ball (Comparative Example 1) was simultaneously evaluated, and the ball was evaluated according to the following criterion.

[Scuff Resistance]

A ball was conditioned at 23° C. Using a swing robot machine equipped with a pitching wedge, the ball was hit at a head speed of 33 m/s. Signs of damage by impact were visually examined. The ball was evaluated according to the following criterion.

○: Damage was not observed, or was of such a limited degree as to pose no impediment to further use of the ball X: serious signs of damage such as fluffed surface and chipped dimples

[Feel]

Five top-caliber amateur golfers actually hit a ball with a driver (W#1) and rated according to the following criterion.

⊚: very good

○: good

[Manufacture of Golf Ball Core]

A core-forming composition of the formulation shown in Table 1 was vulcanized in a mold, producing a core having physical properties and shape as shown in Table 1.

TABLE 1

|  | Core type | No. 1 | No. 2 |
|---|---|---|---|
| Formulation (pbw) | Polybutadiene rubber (BR01 by JSR) | 100 | 100 |
|  | Zinc acrylate | 21.5 | 21.5 |
|  | Dicumyl peroxide | 1 | 1 |
|  | Zinc oxide | 12 | 26.3 |
| Vulcanizing conditions | Temperature (° C.) | 155 | 155 |
|  | Time (min) | 20 | 20 |
| Core | Specific gravity | 1.07 | 1.16 |
|  | Weight (g) | 32.1 | 34.8 |
|  | Outer diameter (mm) | 38.5 | 38.5 |
|  | Hardness (mm) | 3.4 | 3.4 |
|  | Initial velocity (m/s) | 78.1 | 77.3 |

[Polyether Ester Block Copolymer A]

Polyether ester block copolymers (A-1) and (A-2) which were polymerized and pelletized as described in Reference Examples 1 and 2 were used.

Reference Example 1

A reactor equipped with a helical ribbon agitating blade was charged with 419 parts of terephthalic acid, 409 parts of 1,4-butanediol and 476 parts of poly(tetramethylene oxide) glycol having a number average molecular weight of about 1,400 (Terathane 1400 by DuPont) together with 2 parts of titanium tetrabutoxide. Esterification reaction was performed by heating at 190 to 225° C. for 3 hours while distilling water of reaction out of the system. Irganox 1010 (hindered phenol antioxidant by Ciba Geigy), 0.75 part, was added to the reaction mixture, which was heated at 245° C. Then the system was evacuated over 40 minutes to a vacuum of 27 Pa. Under these conditions, polymerization took place for 2 hours 40 minutes, producing a polyether ester block copolymer (A-1). The polymer was ejected into water in strands, which were cut into pellets. The pellets had a melting point of 195° C., a melt viscosity index (MFR) of 18 g/10 min as measured at 220° C., a hardness of 47 in Shore D, and a specific gravity of 1.15.

Reference Example 2

Aside from using 444 parts of terephthalic acid, 386 parts of 1,4-butanediol and 439 parts of poly(tetramethylene oxide) glycol having a number average molecular weight of about 1,400 (PTG1400SN by Hodogaya Chemical Co., Ltd.), polymerization was carried out as in Reference Example 1, producing a polyether ester block copolymer (A-2), which was cut into pellets. The pellets had a melting point of 199° C., a melt viscosity index (MFR) of 16 g/10 min as measured at 220° C., a hardness of 50 in Shore D, and a specific gravity of 1.17.

[Thermoplastic Polyurethane Elastomer B]

Thermoplastic polyurethane elastomer used in Examples and Comparative Examples is identified below.

B-1: Pandex T-8295 by DIC-Bayer Polymer Co., Ltd., polyether type thermoplastic polyurethane elastomer, Shore D hardness 56

[Polyisocyanate Compound C]

Polyisocyanate compounds used in Examples and Comparative Examples are identified below.

C-1: Millionate MT by Nippon Polyurethane Industry Co., Ltd. (diphenylmethane-4,4'-diisocyanate)

C-2: Collonate HX by Nippon Polyurethane Industry Co., Ltd. (polyisocyanate having an isocyanurate structure resulting from trimerization of hexamethylenediisocyanate)

C-3: Millionate MR-400 by Nippon Polyurethane Industry Co., Ltd. (polymethylene polyphenyl polyisocyanate, containing at least 71% of isocyanate having at least 3 isocyanate groups per molecule)

[Ionomer Resin D]

Ionomer resins used in Comparative Examples are identified below.

D-1: Surlyn 8120, by DuPont, ethylene-methacrylic acid-acrylate terpolymer ionomer, ion species Na, surface hardness (Shore D) 45

D-2: Himilan 1706, by Dupont-Mitsui Polychemicals Co., Ltd., ethylene-methacrylic acid copolymer ionomer, ion species Zn, surface hardness (Shore D) 62

D-3: Himilan AM7316, by Dupont-Mitsui Polychemicals Co., Ltd., ethylene-methacrylic acid-acrylate terpolymer ionomer, ion species Zn, surface hardness (Shore D) 40

Examples 1 and 2

Using a V-blender, pellets of polyether ester block copolymer (A) and pellets of thermoplastic polyurethane elastomer (B), which had been dried in hot air at 80° C. for 3 hours, were dry blended in a blending ratio as shown in Table 2. Using a twin-screw extruder having a triple-thread screw with a diameter of 45 mm, the dry blend was melt mixed at 230° C. and then pelletized, obtaining a resin composition. Using a V-blender, pellets of the resin composition which had been dried in hot air at 80° C. for 3 hours were dry blended with polyisocyanate compound (C) in a blending ratio as shown in Table 2. The dry blend was fed to a hopper of a Neomat 150/75 SYCAP-M Model Sumitomo-Netstal injection molding machine by Sumitomo Heavy Industries, Ltd. The dry blend was fed from the hopper to the chamber of the molding machine where it was melt mixed within the cylinder set at 240° C. and then injection molded into a mold cavity set at 50° C. In this way, a disk-shaped product having a diameter of 100 mm and a thickness of 3 mm was obtained. The product was held at 23° C. and 50% RH for 24 hours before a wear rate was determined, and a specific wear rate of formula (1) was computed therefrom. Separately, specimens were prepared and measured for surface hardness and rebound resilience. The results are also shown in Table 2.

Similarly, using a V-blender, pellets of polyether ester block copolymer (A) and pellets of thermoplastic polyurethane elastomer (B), which had been dried in hot air at 80° C. for 3 hours, were dry blended in a blending ratio as shown in Table 2. Using a twin-screw extruder having a triple-thread screw with a diameter of 45 mm, the dry blend was melt mixed at 230° C. and then pelletized, obtaining a resin composition. Using a V-blender, pellets of the resin composition which had been dried in hot air at 80 C. for 3 hours were dry blended with polyisocyanate compound (C) in a blending ratio as shown in Table 2. Using an injection molding machine in which the core shown in Table 1 was held in place within a mold which was used in conventional golf ball molding, the blends were molded to produce two-piece golf balls as shown in Table 3. The golf balls were examined by the above-described test procedures, with the results shown in Table 3.

Examples 3 and 4

Each of polyisocyanate compounds (C-2) and (C-3) was blended with each of copolymeric polyester resins to furnish three types of pelletized master batch having a polyisocyanate compound content of 30 wt %. Using a V-blender, pellets of polyether ester block copolymer (A) and pellets of thermoplastic polyurethane elastomer (B), which had been dried in hot air at 80° C. for 3 hours, were dry blended in a blending ratio as shown in Table 2. Using a twin-screw extruder having a triple-thread screw with a diameter of 45 mm, the dry blend was melt mixed at 230° C. and then pelletized, obtaining a resin composition. Using a V-blender, pellets of the resin composition which had been dried in hot air at 80° C. for 3 hours were dry blended with the pelletized master batch of each type so that the blending ratio of polyether ester block copolymer (A) to thermoplastic polyurethane elastomer (B) to polyisocyanate compound (C) was as shown in Table 2. The dry blend was fed to a hopper of a Neomat 150/75 SYCAP-M Model Sumitomo-Netstal injection molding machine by Sumitomo Heavy Industries, Ltd. The dry blend was fed from the hopper to the chamber of the molding machine where it was melt mixed within the cylinder set at 240° C. and then injection molded into a mold cavity set at 50° C. In this way, a disk-shaped product having a diameter of 100 mm and a thickness of 3 mm was obtained. The product was held at 23° C. and 50% RH for 24 hours before a wear rate was determined, and a specific wear rate of formula (1) was computed therefrom. Separately, specimens were prepared and measured for surface hardness and rebound resilience. The results are also shown in Table 2.

Similarly, each of polyisocyanate compounds (C-2) and (C-3) was blended with each of copolymeric polyester resins to furnish three types of pelletized master batch having a polyisocyanate compound content of 30 wt %. Using a V-blender, pellets of polyether ester block copolymer (A) and pellets of thermoplastic polyurethane elastomer (B), which had been dried in hot air at 80° C. for 3 hours, were dry blended in a blending ratio as shown in Table 2. Using a twin-screw extruder having a triple-thread screw with a diameter of 45 mm, the dry blend was melt mixed at 230° C. and then pelletized, obtaining a resin composition. Using a V-blender, pellets of the resin composition which had been dried in hot air at 80° C. for 3 hours were dry blended with the pelletized master batch of each type so that the blending ratio of polyether ester block copolymer (A) to thermoplastic polyurethane elastomer (B) to polyisocyanate compound (C) was as shown in Table 2. Using an injection molding machine in which the core shown in Table 1 was held in place within a mold which was used in conventional golf ball molding, the blends were molded to produce two-piece golf balls as shown in Table 3. The golf balls were examined by the above-described test procedures, with the results shown in Table 3.

Examples 5 and 6

Using a V-blender, pellets of polyether ester block copolymer (A) and pellets of thermoplastic polyurethane elastomer (B), which had been dried in hot air at 80° C. for 3 hours, were dry blended with polyisocyanate compound (C) in a blending ratio as shown in Table 2. Using a twin-screw extruder having a triple-thread screw with a diameter of 45 mm, the dry blend was melt mixed at 230° C. and then pelletized, obtaining a golf ball-forming resin composition. The pellets were dried in hot air at 80° C. for 3 hours and then fed to a hopper of a Neomat 150/75 SYCAP-M Model Sumitomo-Netstal injection molding machine by Sumitomo Heavy Industries, Ltd. The dry blended mixture was fed from the hopper to the chamber of the molding machine where it was melt mixed within the cylinder set at 240° C. and then injection molded into a mold cavity set at 50° C. In this way, a disk-shaped product having a diameter of 100 mm and a thickness of 3 mm was obtained. The product was held at 23° C. and 50% RH for 24 hours before a wear rate was determined, and a specific wear rate of formula (1) was computed therefrom. Separately, specimens were prepared and measured for surface hardness and rebound resilience. The results are also shown in Table 2.

Similarly, using a V-blender, pellets of polyether ester block copolymer (A) and pellets of thermoplastic polyurethane elastomer (B), which had been dried in hot air at 80° C. for 3 hours, were dry blended with polyisocyanate compound (C) in a blending ratio as shown in Table 2. Using a twin-screw extruder having a triple-thread screw with a diameter of 45 mm, the dry blend was melt mixed at 230° C. and then pelletized, obtaining a golf ball-forming resin composition. Using an injection molding machine in which the core shown in Table 1 was held in place within a mold which was used in conventional golf ball molding, the pellets which had been dried in hot air at 80° C. for 3 hours were molded to produce two-piece golf balls as shown in Table 3. The golf balls were examined by the above-described test procedures, with the results shown in Table 3.

Example 7

Pellets of polyether ester block copolymer (A) and pellets of thermoplastic polyurethane elastomer (B), which had been dried in hot air at 80° C. for 3 hours, were melted by melt mixing at 240° C. for 2.5 minutes in a kneader having a pair of parallel blades. To the kneader, polyisocyanate compound (C) was fed so as to give a blending ratio as shown in Table 2. Further melt mixing at 240° C. for 2.5 minutes yielded a golf ball-forming resin composition. The melt mixed composition was taken out, ground on a grinder, and press molded into a sheet. Using the pressed sheet, a wear rate, surface hardness and rebound resilience were determined, a specific wear rate being computed from the wear rate according to formula (1). The results are also shown in Table 2.

Similarly, pellets of polyether ester block copolymer (A) and pellets of thermoplastic polyurethane elastomer (B), which had been dried in hot air at 80° C. for 3 hours, were melted by melt mixing at 240° C. for 2.5 minutes in a kneader having a pair of parallel blades. To the kneader, polyisocyanate compound (C) was fed so as to give a blending ratio as shown in Table 2. Further melt mixing at 240° C. for 2.5 minutes yielded a golf ball-forming resin composition. The melt mixed composition was taken out, ground on a grinder, and press molded into a sheet.

By placing the core shown in Table 1 within a mold of a compression molding machine which was used in conventional golf ball molding, and placing the sheet pressed as above on the surface of the core, two-piece golf balls as shown in Table 3 were manufactured. The golf balls were examined by the above-described test procedures, with the results shown in Table 3.

TABLE 2

| Blending Ratio | | Example | | | | | | |
|---|---|---|---|---|---|---|---|---|
| (pbw) | | 1 | 2 | 3 | 4 | 5 | 6 | 7 |
| Polyether ester block copolymer | A-1 | 75 | — | — | 60 | 80 | — | 50 |
| | A-2 | — | 50 | 90 | — | — | 60 | — |
| Thermoplastic polyurethane elastomer | B-1 | 25 | 50 | 10 | 40 | 20 | 40 | 50 |
| Polyisocyanate compound | C-1 | 3 | — | — | — | — | — | — |
| | C-2 | — | 1 | — | 3 | 2 | — | 0.3 |
| | C-3 | — | — | 2 | — | — | 1 | — |
| Titanium oxide | | 3 | 3 | 3 | 3 | 3 | 3 | 3 |
| Polyethylene wax | | 0.5 | 0.5 | 0.5 | 0.5 | 0.5 | 0.5 | 0.5 |
| Surface hardness (Shore D) | | 53 | 53 | 51 | 53 | 52 | 53 | 52 |
| Rebound resilience (%) | | 67 | 60 | 67 | 62 | 67 | 62 | 60 |
| Wear rate Wa-Wb (mg) | | 68 | 21 | 29 | 18 | 31 | 23 | 42 |
| Specific wear rate (mm³/(N·km)) | | 0.40 | 0.12 | 0.17 | 0.11 | 0.18 | 0.13 | 0.25 |

*In Examples 3 and 4, components were formulated using the pelletized master batch.

TABLE 3

| | | Example | | | | | | |
|---|---|---|---|---|---|---|---|---|
| | | 1 | 2 | 3 | 4 | 5 | 6 | 7 |
| Core | Type | No. 1 | No. 1 | No. 1 | No. 1 | No. 1 | No. 1 | No. 1 |
| Finished ball | Outer diameter (mm) | 42.7 | 42.7 | 42.7 | 42.7 | 42.7 | 42.7 | 42.7 |
| | Weight (g) | 45.2 | 45.2 | 45.2 | 45.2 | 45.2 | 45.2 | 45.2 |
| | Hardness (mm) | 2.7 | 2.7 | 2.8 | 2.7 | 2.8 | 2.7 | 2.8 |
| | Initial velocity (m/s) | 77.3 | 77.2 | 77.3 | 77.2 | 77.3 | 77.2 | 77.2 |
| Flight performance | Carry (m) | 218 | 218 | 219 | 217 | 219 | 217 | 218 |
| | Total (m) | 227 | 226 | 229 | 226 | 228 | 227 | 227 |
| Feel | | ⊚ | ⊚ | ⊚ | ⊚ | ⊚ | ⊚ | ⊚ |
| Scuff resistance | | ○ | ○ | ○ | ○ | ○ | ○ | ○ |
| Durability to repeated impact | | ○ | ○ | ○ | ○ | ○ | ○ | ○ |

Comparative Examples 1 to 6

Using a V-blender, pellets of polyether ester block copolymer (A) and pellets of thermoplastic polyurethane elastomer (B), which had been dried in hot air at 80° C. for 3 hours, were dry blended in a blending ratio as shown in Table 4. Using a twin-screw extruder having a triple-thread screw with a diameter of 45 mm, the dry blend was melt mixed at 230° C. and then pelletized, obtaining a resin composition. The pellets of the resin composition were dried in hot air at 80° C. for 3 hours, fed to a hopper of a Neomat 150/75 SYCAP-M Model Sumitomo-Netstal injection molding machine by Sumitomo Heavy Industries, Ltd., and then injection molded into a mold cavity set at 50° C. In this way, a disk-shaped product having a diameter of 100 mm and a thickness of 3 mm was obtained. The product was held at 23° C. and 50% RH for 24 hours before a wear rate was determined, and a specific wear rate was computed therefrom. Separately, specimens were prepared and measured for surface hardness and rebound resilience. The results are also shown in Table 4.

Similarly, using a V-blender, pellets of polyether ester block copolymer (A) and pellets of thermoplastic polyurethane elastomer (B), which had been dried in hot air at 80° C. for 3 hours, were dry blended in a blending ratio as shown in Table 4. Using a twin-screw extruder having a triple-thread screw with a diameter of 45 mm, the dry blend was melt mixed at 230° C. and then pelletized, obtaining a resin composition. Using an injection molding machine in which the core shown in Table 1 was held in place within a mold which was used in conventional golf ball molding, the pellets of the resin composition which had been dried in hot air at 80° C. for 3 hours were molded to produce two-piece golf balls as shown in Table 5. The golf balls were examined by the above-described test procedures, with the results shown in Table 5.

Comparative Example 7

Pellets of polyether ester block copolymer (A) and pellets of thermoplastic polyurethane elastomer (B), which had been dried in hot air at 80° C. for 3 hours, were melted by melt mixing at 240° C. for 2.5 minutes in a kneader having a pair of parallel blades. To the kneader, polyisocyanate compound (C) was fed so as to give a blending ratio as shown in Table 4. An attempt was made to continue melt golf balls thus obtained were examined by the above-described test procedures, with the results shown in Table 5.

Comparative Example 9

Using a thermoplastic polyurethane resin (MDI-PTMG type thermoplastic polyurethane elastomer) instead of the golf ball-forming resin composition, and an injection molding machine in which the core shown in Table 1 was held in place within a mold which was used in conventional golf ball molding, two-piece golf balls were produced as shown in Table 5. The golf balls thus obtained were examined by the above-described test procedures, with the results shown in Table 5.

TABLE 4

| Blending ratio (pbw) | | Comparative Example | | | | | | | | |
|---|---|---|---|---|---|---|---|---|---|---|
| | | 1 | 2 | 3 | 4 | 5 | 6 | 7 | 8 | 9 |
| Polyether ester block copolymer | A-1 | 75 | 50 | 25 | — | — | — | 50 | | |
| | A-2 | — | — | — | 75 | 50 | 25 | — | | |
| Thermoplastic polyurethane Elastomer | B-1 | 25 | 50 | 75 | 25 | 50 | 75 | 50 | | |
| | B-2 | | | | | | | | | 100 |
| Polyisocyanate compound | C-1 | — | — | — | — | — | — | — | | |
| | C-2 | — | — | — | — | — | — | — | | |
| | C-3 | — | — | — | — | — | — | 15 | | |
| Ionomer resin | D-1 | | | | | | | | 50 | |
| | D-2 | | | | | | | | 35 | |
| | D-3 | | | | | | | | 15 | |
| Titanium oxide | | 3 | 3 | 3 | 3 | 3 | 3 | 3 | 3 | 3 |
| Polyethylene wax | | 0.5 | 0.5 | 0.5 | 0.5 | 0.5 | 0.5 | 0.5 | 0.5 | 0.5 |
| Surface hardness (Shore D) | | 49 | 50 | 55 | 49 | 50 | 52 | — | 50 | 50 |
| Rebound resilience (%) | | 64 | 58 | 53 | 63 | 57 | 52 | — | 50 | 45 |
| Wear rate Wa-Wb (mg) | | 153 | 121 | 96 | 92 | 90 | 89 | — | — | 275 |
| Specific wear rate (mm³/(N·km)) | | 0.89 | 0.69 | 0.56 | 0.53 | 0.52 | 0.51 | — | — | 1.58 |

TABLE 5

| | | Comparative Example | | | | | | | |
|---|---|---|---|---|---|---|---|---|---|
| | | 1 | 2 | 3 | 4 | 5 | 6 | 8 | 9 |
| Core | Type | No. 1 | No. 1 | No. 1 | No. 1 | No. 1 | No. 1 | No. 2 | No. 1 |
| Finished ball | Outer diameter (mm) | 42.7 | 42.7 | 42.7 | 42.7 | 42.7 | 42.7 | 42.7 | 42.7 |
| | Weight (g) | 45.2 | 45.2 | 45.2 | 45.2 | 45.2 | 45.2 | 45.2 | 45.2 |
| | Hardness (mm) | 3.0 | 2.9 | 2.6 | 3.0 | 2.9 | 2.8 | 2.9 | 2.9 |
| | Initial velocity (m/s) | 77.2 | 77.1 | 77.1 | 77.2 | 77.1 | 77.1 | 76.8 | 77.0 |
| Flight performance | Carry (m) | 217 | 216 | 215 | 217 | 215 | 216 | 214 | 215 |
| | Total (m) | 226 | 226 | 225 | 226 | 225 | 225 | 224 | 225 |
| Feel | | ⊙ | ⊙ | ⊙ | ⊙ | ⊙ | ⊙ | ⊙ | ⊙ |
| Scuff resistance | | X | X | X | X | X | X | ◯ | ◯ |
| Durability to repeated impact | | — | X | X | X | X | X | X | ◯ | mixing at 240° C., but the resin composition quickly gelled and stuck to the blades. A sample was scraped from the resin composition caught on the blades and examined. The sample was insoluble, infusible and not moldable or processable, and its physical properties could not be determined.

Comparative Example 8

Using an ionomer resin instead of the golf ball-forming resin composition, and an injection molding machine in which the core shown in Table 1 was held in place within a mold which was used in conventional golf ball molding, two-piece golf balls were produced as shown in Table 5. The As is evident from the above results, the golf ball-forming resin compositions of Examples 1 to 7 have flexibility and a high rebound resilience and are tough and improved in wear resistance and durability to repeated impact. The golf balls manufactured using the inventive golf ball-forming resin compositions of Examples 1 to 7 show a good balance of travel distance, feel, scuff resistance and impact durability. In contrast, the resins of Comparative Examples 1 to 6 are flexible and some are high in rebound resilience, but show a poor wear resistance and poor durability to repeated impact and are not tough. The golf balls manufactured using the resins of Comparative Examples 1 to 6 are inferior in scuff resistance and impact durability. Both the golf ball manufactured using the ionomer resin of Comparative Example 8 and the golf ball manufactured using the thermoplastic polyurethane resin of Comparative Example 9 are inferior in travel distance.

What is claimed is:

1. A golf ball comprising a core of at least one layer, a cover of at least one layer, and optionally an intermediate layer therebetween, characterized in that at least one layer of said core, said cover and said intermediate layer is formed of a golf ball-forming resin composition comprising (A) 50 to 95% by weight of a polyether ester block copolymer composed primarily of (a) high-melting crystalline polymer segments made of crystalline aromatic polyester units and (b) low-melting polymer segments made of aliphatic polyether units and (B) 5 to 50% by weight of a thermoplastic polyurethane elastomer, the total of components (A) and (B) being 100 parts by weight, in admixture with (C) 0.05 to 10 parts by weight of a polyisocyanate compound.

2. The golf ball of claim 1, wherein said polyisocyanate compound (C) is a polyisocyanate compound containing, on average, more than two isocyanate groups in a molecule.

3. The golf ball of claim 1, wherein at least 50% by weight of said polyisocyanate compound (C) is a polyisocyanate compound containing at least three isocyanate groups in a molecule.

4. The golf ball of claim 1, wherein at least 70% by weight of said polyisocyanate compound (C) is a polyisocyanate compound containing at least three isocyanate groups in a molecule.

5. The golf ball of claim 1, wherein a molded product molded from said golf ball-forming resin composition by injection molding or the like has a Shore D hardness of 25 to 85 based on ASTM D-2240 and a rebound resilience of 40 to 90% based on British Standard 903.

6. The golf ball of claim 1, wherein when a molded product molded from said golf ball-forming resin composition by injection molding or the like is subjected to sliding wear according to JIS K7218, Method A by rotating a hollow ring of metal under an applied load, the molded product has a specific wear rate, as determined under conditions: a test speed v of 0.5 m/s, a test load P of 50 N, and a sliding distance L of 3 km, that satisfies the formula (1):

$$Vx=[(Wa-Wb)/(\rho \cdot 1000)]/(P \cdot L) \leq 0.5 \qquad (1)$$

wherein $Vx$ is a specific wear rate ($mm^3/(N \cdot km)$) of said golf ball-forming resin composition, $Wa$ and $Wb$ are the weights (mg) of a test piece in the form of the molded product of said golf ball-forming resin composition before and after the test, respectively, and $\rho$ is the density ($kg/m^3$) of said golf ball-forming resin composition.

7. The golf ball of claim 1, which is a two-piece golf ball consisting of a single layer core and a single layer cover wherein said golf ball-forming resin composition is applied as the material of said cover.

8. The golf ball of claim 1, which is a three-piece golf ball consisting of a single layer core, a single layer cover and an intermediate layer wherein said golf ball-forming resin composition is applied as the material of said cover.

* * * * *